United States Patent [19]

Wisler

[11] Patent Number: 5,144,245
[45] Date of Patent: Sep. 1, 1992

[54] METHOD FOR EVALUATING A BOREHOLE FORMATION BASED ON A FORMATION RESISTIVITY LOG GENERATED BY A WAVE PROPAGATION FORMATION EVALUATION TOOL

[75] Inventor: Macmillan M. Wisler, New Haven, Conn.

[73] Assignee: Teleco Oilfield Services Inc., Meriden, Conn.

[21] Appl. No.: 680,987

[22] Filed: Apr. 5, 1991

[51] Int. Cl.$^5$ .............................................. G01V 3/30
[52] U.S. Cl. ...................................... 324/338; 364/422
[58] Field of Search .............. 324/338, 334, 333, 341, 324/244, 202, 245; 364/570, 571.01, 571.02, 571.07, 571.08, 422; 367/13

[56] References Cited

U.S. PATENT DOCUMENTS 4,739,262  4/1988  Fleetwood ...................... 324/244 X
4,899,112  2/1990  Clark et al. ........................ 324/338
5,001,675  3/1991  Woodward ..................... 324/202 X Primary Examiner—Kenneth A. Wieder
Assistant Examiner—Warren S. Edmonds
Attorney, Agent, or Firm—Fishman, Dionne & Cantor

[57] ABSTRACT

The method evaluates borehole formations using corrected formation resistivity logs obtained from a formation evaluation tool. In accordance with the present invention the method corrects the error in the amplitude ratio resistivity curve $R_{ar}$ and the phase difference resistivity curve $R_{pd}$ thereby providing a more accurate formation resistivity log. The method of this invention employs a low frequency mixing law such as Archie's equation in combination with a high frequency mixing law such as Complex Refractive Index Method (CRIM) to correct the measurements of wave propagation type formation evaluation tools for the effects of the dielectric constant on the tool's measured parameters.

18 Claims, 7 Drawing Sheets

METHOD FOR EVALUATING A BOREHOLE FORMATION BASED ON A FORMATION RESISTIVITY LOG GENERATED BY A WAVE PROPAGATION FORMATION EVALUATION TOOL

BACKGROUND OF THE INVENTION

This invention relates generally to borehole formation evaluation instrumentation. More particularly, this invention relates to a method for correcting errors in formation resistivity logs derived from an electromagnetic propagation based borehole formation evaluation instrument used primarily in oil and gas well drilling applications.

Borehole formation evaluation tools are known which measure phase and/or amplitude of electromagnetic waves to determine an electrical property (such as resistivity or permittivity) of a section of a borehole. Typically, the existing tools used for this application are composed of one or more transmitting antennas spaced from one or more pairs of receiving antennas. An electromagnetic wave is propagated from the transmitting antenna into the formation surrounding the borehole and is detected as it passes by the two receiving antennas. In a resistivity measuring tool, magnetic dipoles are employed which operate in the mf and lower hf spectrum. In contrast, permittivity tools utilize electric dipoles in the VHF or UHF ranges.

In a known resistivity sensor of the type hereinabove discussed which is used by Teleco Oilfield Services, Inc., assignee of the present application, the resistivity sensor measures both phase difference and amplitude ratio to provide two resistivities with different depths of investigation. A signal received in a first receiving antenna is shifted in phase and its amplitude will be less than the signal received in a second receiving antenna. Resistivities are then derived from both the phase difference ($R_{pd}$) and the amplitude ratio ($R_{ar}$) of the received signals. This differential measurement is primarily responsive to the formation opposite the receiving antennas and is less sensitive to the borehole and/or variations in the transmitted signal as in prior art sensing devices. An example of a formation evaluation instrument of this type is described in FIGS. 1 and 2 of U.S. Pat. No. 5,001,675 which is assigned to the assignee hereof and fully incorporated herein by reference.

While well suited for its intended purposes, a problem with existing electromagnetic propagation sensors of the type described herein consists of errors present in the respective $R_{pd}$ and $R_{ar}$ curves which make up the formation resistivity log. Theoretically, the two resistivity curves $R_{ar}$ and $R_{pd}$ should be coincident or at least substantially coincident. However, under typical measurement conditions, the two resistivity curves $R_{ar}$ and $R_{pd}$ deviate from each other beyond what would be theoretically expected with separations or gaps resulting between the two curves. These deviations are due to dielectric effects which are accounted for in the transformation from phase difference and amplitude ratio to the resistivity values $R_{ar}$ and $R_{pd}$. These separations represent error in the resistivity curves $R_{ar}$ and $R_{pd}$ and may result in formation resistivity logs having a less than desirable accuracy.

U.S. Pat. No. 4,899,112 to Clark et al describes a method for correcting this error. The Clark et al patent uses a look-up table derived from measured core data (see FIG. 12 of Clark et al) and an iterative method (as described in FIG. 8 of Clark et al) to derive a correction to the resistivity curves $R_{ar}$ and $R_{pd}$. The iterative method of Clark et al uses the core data to derive a correlation between the dielectric permittivity and conductivity of earth formations. This correlation is then used to make the transformation from phase difference or amplitude ratio to resistivity. Unfortunately, this method is limited by the accuracy of the core data. It is well known that accurate core data (at operating frequencies of 2 MHz) is difficult to obtain. Thus, the corrective method of Clark et al is itself subject to inaccuracy and error.

SUMMARY OF THE INVENTION

The above-discussed and other problems and deficiencies of the prior art are overcome or alleviated by the method for generating corrected formation resistivity logs obtained from a formation evaluation tool of the present invention. In accordance with the present invention, a method is provided for correcting the error in the amplitude ratio resistivity curve $R_{ar}$ and the phase difference resistivity curve $R_{pd}$ thereby providing a more accurate formation resistivity log. The method of this invention employs a low frequency mixing law such as Archie's equation in combination with a high frequency mixing law such as Complex Refractive Index Method (CRIM) to correct the measurements of wave propagation type formation evaluation tools for the effects of the dielectric constant on the tool's measured parameters.

The method of this invention provides certain advantages and features relative to the prior art correction method of U.S. Pat. No. 4,899,112. For example, the present invention is not dependent upon possibly inaccurate core data as in the method of U.S. Pat. No. 4,899,112. Instead, the method of this invention utilizes a theoretical model. Also, the present invention is not restricted to the correlation of resistivity to dielectric as is the method of U.S. Pat. No. 4,899,112.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGS..

DESCRIPTION OF THE PREFERRED EMBODIMENT

Figure 10:
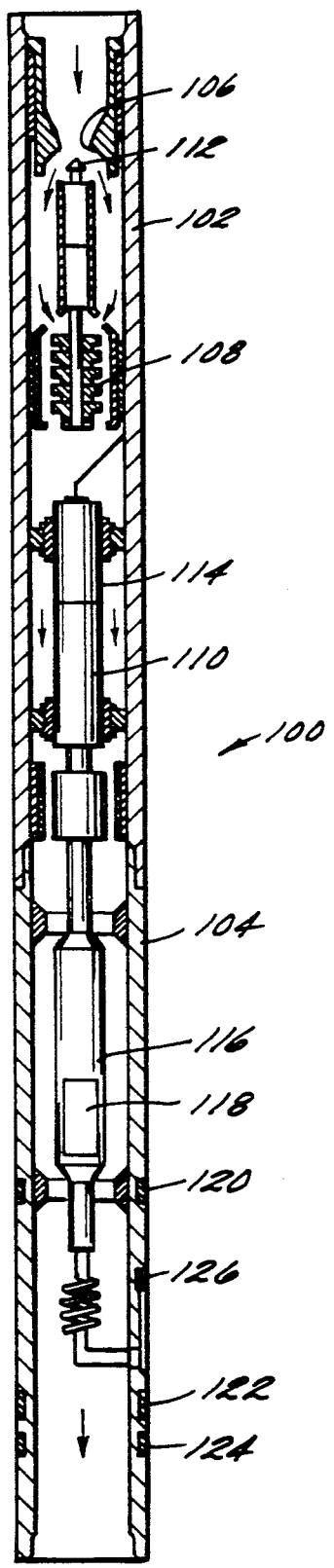
FIG. 10 is a longitudinal view through a known wave propagation formation evaluation tool.

Referring first to FIG. 10, an electromagnetic propagation resistivity tool used by Teleco Oilfield Services, Inc., is shown generally at 100. Tool 100 comprises a pair of drill collar segments 102 and 104. As is well known, drilling fluid or mud is pumped within the drillstring as indicated by the arrows in FIG. 10. The mud flows through a variable flow orifice 106 and is delivered to drive a first turbine 108. This first turbine 108 powers a generator which delivers electrical power to the sensors in a sensor unit 110. The output from sensor unit 110, which may be in the form of electrical, hydraulic or similar signals, operates a plunger 112 which varies the size of variable orifice 114, plunger 112 having a valve driver which may be hydraulically or electrically operated. Variations in the size of orifice 106 create pressure pulses in the mud stream which are transmitted to and sensed at the surface to provide indications of various conditions sensed by sensor unit 110. This activity is directed by a microporcessor and electronics unit 114.

Since sensors in sensor unit 110 are magnetically sensitive, the particular drillstring segment 102 which houses the sensor elements must be a non-magnetic section of the drillstring, preferably a stainless steel or monel.

In drillstring segment 104, a known gamma ray and resistivity electronics package 116 is also housed in a non-magnetic drillstring section. Below a gamma sensor 118 is located the electromagnetic propagation resistivity sensor. This comprises a transmitting antenna 120 which is spaced upwardly from two spaced receiving antennas 122 and 124. A memory port 126 communicates with the electronics for fast retrival of stored data when the tool 100 is brought to the surface.

Figure 11:
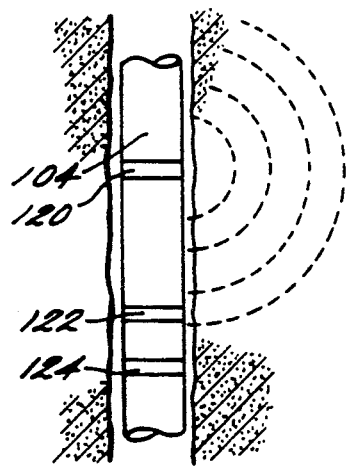
FIG. 11 is a longitudinal schematic depicting the operation of the wave propagation formation evaluation tool as it traverses a borehole.

Referring now also to FIG. 11, the resistivity sensor measures both phase difference and amplitude ratio to provide two apparent resistivities with different depths of investigation. For example, in FIG. 11, a two MHz wave is propagated by transmitting antenna 120 from a transmitter in the tool into the formation and it is detected as it passes the two receivers 122 and 124. The signal at the far receiver 124 is shifted in phase and its amplitude is less than the signal on the near receiver 122. Resistivities are derived from both the phase difference and the amplitude ratio of the received signals. This differential measurement is primarily responsive to the formation opposite the receivers 122 and 124 and is less sensitive to the borehole and/or variations in the transmitted signals.

Figure 1:
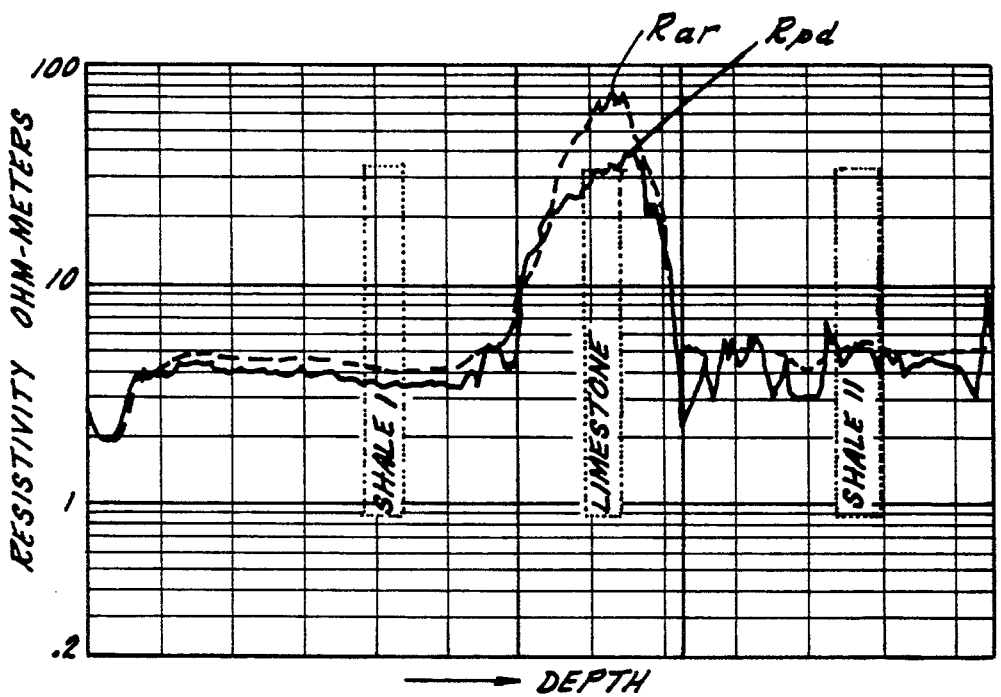
FIG. 1 is a borehole resistivity log depicting an amplitude ratio resistivity curve $R_{ar}$ and a phase difference resistivity curve $R_{pd}$ in accordance with the prior art.

Referring now to FIG. 1, a typical formation resistivity log in accordance with the prior art is shown. The resistivity in FIG. 1 is derived from both amplitude ratio $R_{ar}$ and phase difference $R_{pd}$ in a well-known manner (with a relative dielectric constant of 1 being assumed). The resistivities are shown plotted through three formation zones, namely Shale I, tight (e.g., low porosity), limestone and shale II. It is assumed that no invasion of wellbore fluid has taken place and that the wellbore conditions are good (e.g., no washouts). Theoretically, the two resistivity curves $R_{ar}$ and $R_{pd}$ should be coincident or at least substantially coincident. However, as is clear from a review of FIG. 1, under typical measurement conditions, the two resistivity curves $R_{ar}$ and $R_{pd}$ deviate from each other beyond what would be theoretically expected. The result is separations or gaps between the two resistivity curves $R_{ar}$ and $R_{pd}$ as is evident from FIG. 1. These separations represent error in the resistivity curves Rar and Rpd and arise from effects which are due to mixing of formation constituents (i.e., rock and water) with conductivities which have a significant imaginary component (known as "displacement current"). These separations are undesirable for several reasons. First, the gaps indicate that neither curve Rar or Rpd represent the precise actual formation resistivity. Also, well log analysts may falsely attribute these separations to wellbore fluid invasion (which may not actually be taking place).

Figure 2:
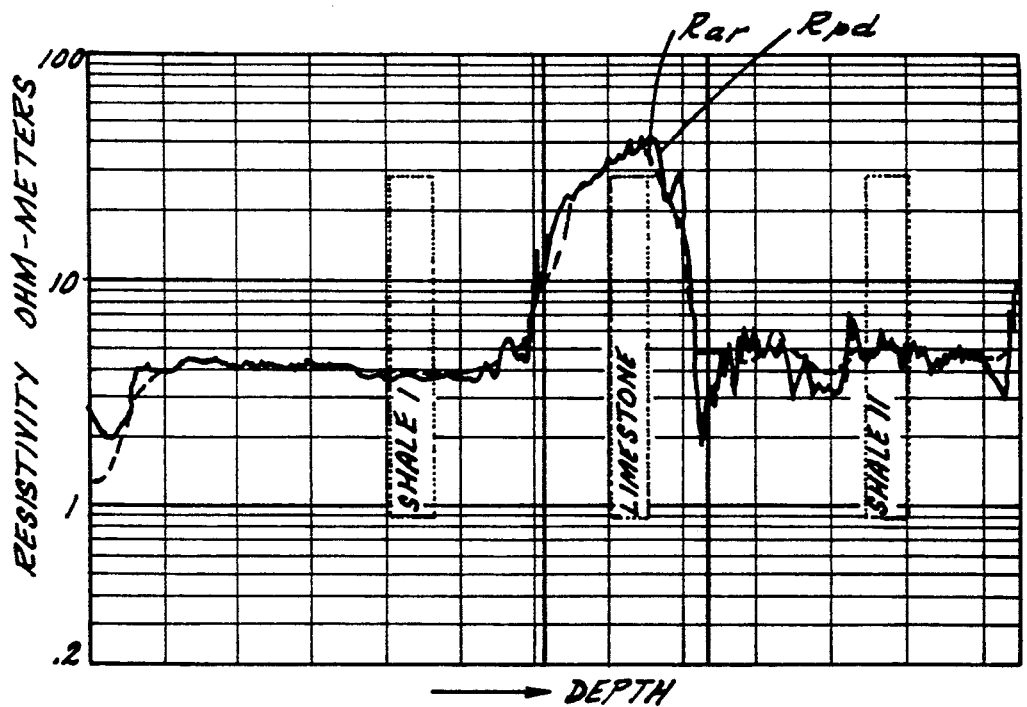
FIG. 2 is a corrected borehole resistivity log depicting an amplitude ratio resistivity curve $R_{ar}$ and a phase difference resistivity curve $R_{pd}$ in accordance with the present invention.

Referring now to FIG. 2 and in accordance with the present invention, a method is provided for correcting the error in the two resistivity curves Rar and Rpd thereby providing a more accurate formation resistivity log. As will be discussed in more detail below, the method of this invention generates resistivity curves Rar and Rpd which are nearly coincident and more accurate.

In general, the present invention involves a method of employing a low frequency (e.g., less than about 500 Khz) mixing law such as Archie's equation in combination with a high frequency (e.g., more than about 500 KHz) mixing law such as Complex Refractive Index Method (CRIM) to correct the measurements by wave propagation type resistivity/conductivity tools for the effects of mixing constituents with conductivities that have a significant imaginary component. The present invention thus determines the amount of correction needed to eliminate the effect of the imaginary part (or displacement current) of the conductivity on the tool's measured parameters. The corrections can be a function of the measured parameters themselves thereby eliminating the need for additional information such as dielectric constant. Both phase-derived and attenuation-derived apparent conductivities and/or resistivities are corrected by the method of this invention.

Archie's equation (1) is widely used to predict the resistivity (at low frequencies) of mixtures of rock, water, and oil in rocks without shale.

$$R_t = \frac{aR_w}{\Phi^m S_w^n} \qquad (1)$$

where $R_t$ is the resistivity of the mixture, a, m, and n are constants which depend on the rock structure, (e.g. a=0.81, m=2, and n=2 for many sandstones), $\Phi$ is the volume fraction of the mixture which is pore space, and $S_w$ is the volume fraction of pore space which is water. For higher frequency tools in which the displacement current as well as the conduction currents are significant, mixing laws such as the complex refractive index method (CRIM), equation (2), have been used (see "Electromagnetic Propagation Logging Advances in Technique and Interpretation" Wharton et al. (SPE 9267) 1980).

$$\sqrt{\epsilon_t} = S_w \Phi \sqrt{\epsilon_w} + (1 - \Phi)\sqrt{\epsilon_m} + (1 - S_w)\Phi \sqrt{\epsilon_h} \quad (2)$$

where the $\epsilon$'s are the complex dielectric constants of the mixture ($\epsilon_t$), water ($\epsilon_w$), rock matrix ($\epsilon_m$), and hydrocarbon ($\epsilon_h$), respectively. Equation (2) can be written equivalently in terms of complex conductivities, $$\sqrt{\sigma_t} = S_w \Phi \sqrt{\sigma_w} + (1 - \Phi)\sqrt{\sigma_m} + (1 - S_w)\Phi \sqrt{\sigma_h} \quad (3)$$

where each $\sigma$ can be written in terms of a purely real and a purely imaginary component (4).

$$\sigma = \sigma_R - iw\epsilon_0\epsilon_r \quad (4)$$

where $\sigma_R$ is the (real) conduction current, w is $2\pi$ times the tool operating frequency, $\epsilon_0$ is the electrical permittivity of free space, and $\epsilon_r$ is the (real) relative dielectric constant. The real part of the conductivity of the hydrocarbon and the (non-shaley) rock matrix is zero and their relative dielectric constants are both small with respect to the relative dielectric constant of water, so the computation of $\sigma_t$ will be affected little if we equate $\sigma_h$ to $\sigma_m$ and obtain, $$\sqrt{\sigma_t} = V_w\sqrt{\sigma_w} + (1 - V_w)\sqrt{\sigma_m} \quad (5)$$

where $V_w = S_w\Phi$ is the fraction of the water-rock-hydrocarbon mixture that is water. Note that we may rewrite the equation (1) in terms of conductivities for the values of a, m, and n suggested above to obtain a similar formula.

$$\sqrt{\sigma_{tR}} = \frac{V_w\sqrt{\sigma_{wR}}}{\sqrt{.81}} \quad (6)$$

where the subscript R's indicate real numbers.

Figure 3:
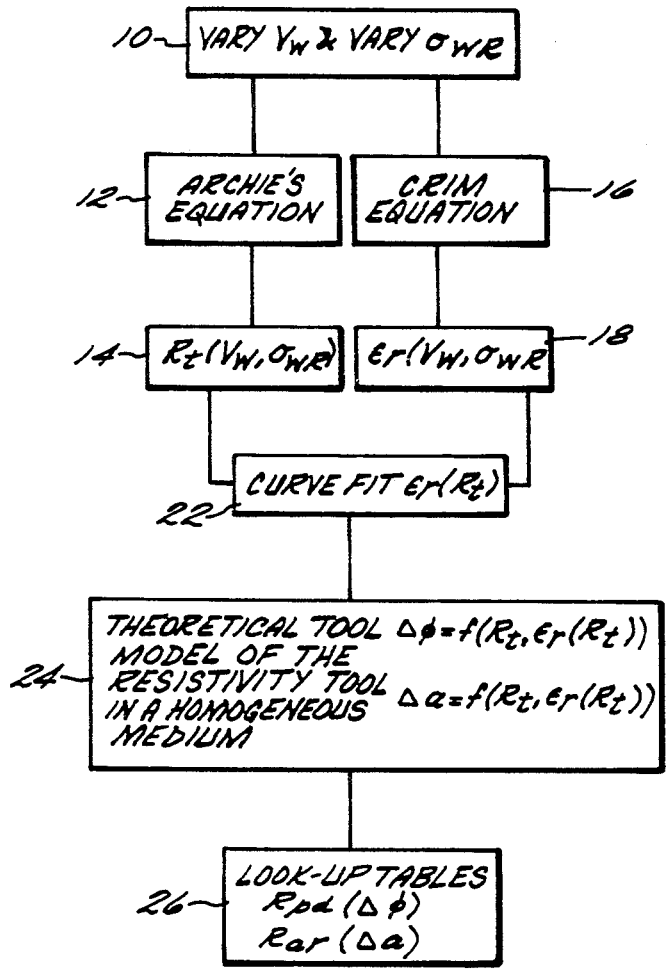
FIG. 3 is a flow diagram depicting a method for determining a look-up table for deriving corrected $R_{pd}$ and corrected $R_{ar}$ in accordance with a first embodiment of the present invention.

Referring now to FIG. 3, a flow chart is presented which depicts a method for correcting the resistivity curves $R_{ar}$ and $R_{pd}$ in accordance with a first embodiment of this invention. In 10, $V_w$ and $\sigma_{wR}$ are each varied throughout ranges which may be encountered in an earth formation.

Next, for each value of $V_w$ (water volume) and $\sigma_{wR}$ (water conductivity), a true formation resistivity, is determined using Archie's equation (equation 1) as shown in 12 and 14. Similarly, a relative dielectric contant, $\epsilon_r$, is determined using the CRIM equation (equation 3) and then solving for dielectric constant $\epsilon_r$ using equation 4 as shown in 16 and 18.

Figure 4:
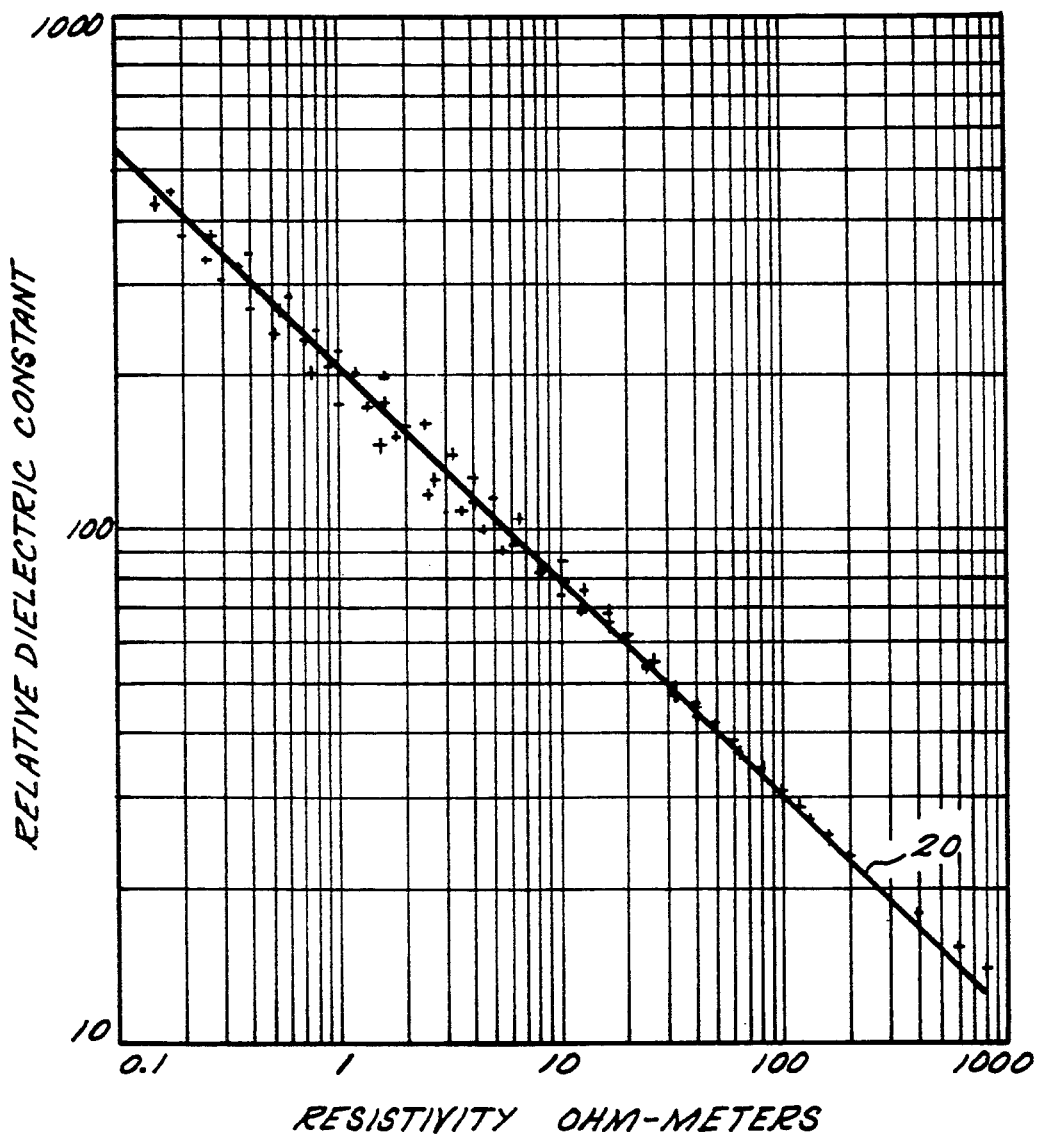
FIG. 4 is a graph of relative dielectric constant versus resistivity for use in the method of FIG. 3.

The generated values $R_t$ and $\epsilon_r$ are then plotted as shown in FIG. 4 where the + signs correspond to the $R_t$ and $\epsilon_r$ values. In FIG. 4, $V_w$ was varied from 0.02 to 0.4 and $R_w$ was varied from 0.02 to 0.6 ohm-meters. A curve 20 is then fit to these generated values (see item 22 in FIG. 3). A theoretical tool model is then employed (see 24). This theoretical model relates the phase difference and amplitude ratios of the tool in a homogeneous medium of a given resistivity and dielectric constant. Such theoretical models are well-known, and described, for example, in Coope, D., Shen, L. C., and Huang, F. S. C., (1984), "The theory of 2 MHz resistivity tool and its application to measurement-while-drilling", The Log Analyst, Vol. 25, No. 3, pp 36–45. Inputs to the theoretical model are $R_t$ and $\epsilon_r(R_t)$. Therefore, both inputs are a function of $R_t$ only. The outputs of the theoretical tool model are phase difference $\Delta\Phi$ and amplitude ratio $\Delta\alpha$. It will be appreciated that the phase difference and amplitude ratio thus generated will also be a function of $R_t$ only. From the set of values $\Delta\Phi$ and $\Delta\alpha$, two look-up tables are generated: one relating $\Delta\Phi$ to $R_{pd}$ and the other relating $\Delta\alpha$ to $R_{ar}$ (see item 26).

Figure 5:
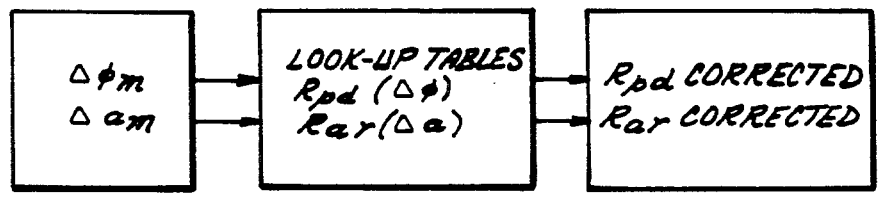
FIG. 5 is a flow diagram showing use of the look-up table derived from the method of FIG. 3 in deriving corrected $R_{pd}$ and $R_{ar}$.

Referring to FIG. 5, the look-up tables described above are used to convert the $\Delta\Phi_m$ and $\Delta\alpha_m$ values actually measured by the downhole tool to corrected $R_{pd}$ and $R_{ar}$ to provide the corrected formation resistivity log of FIG. 2.

Figure 6:
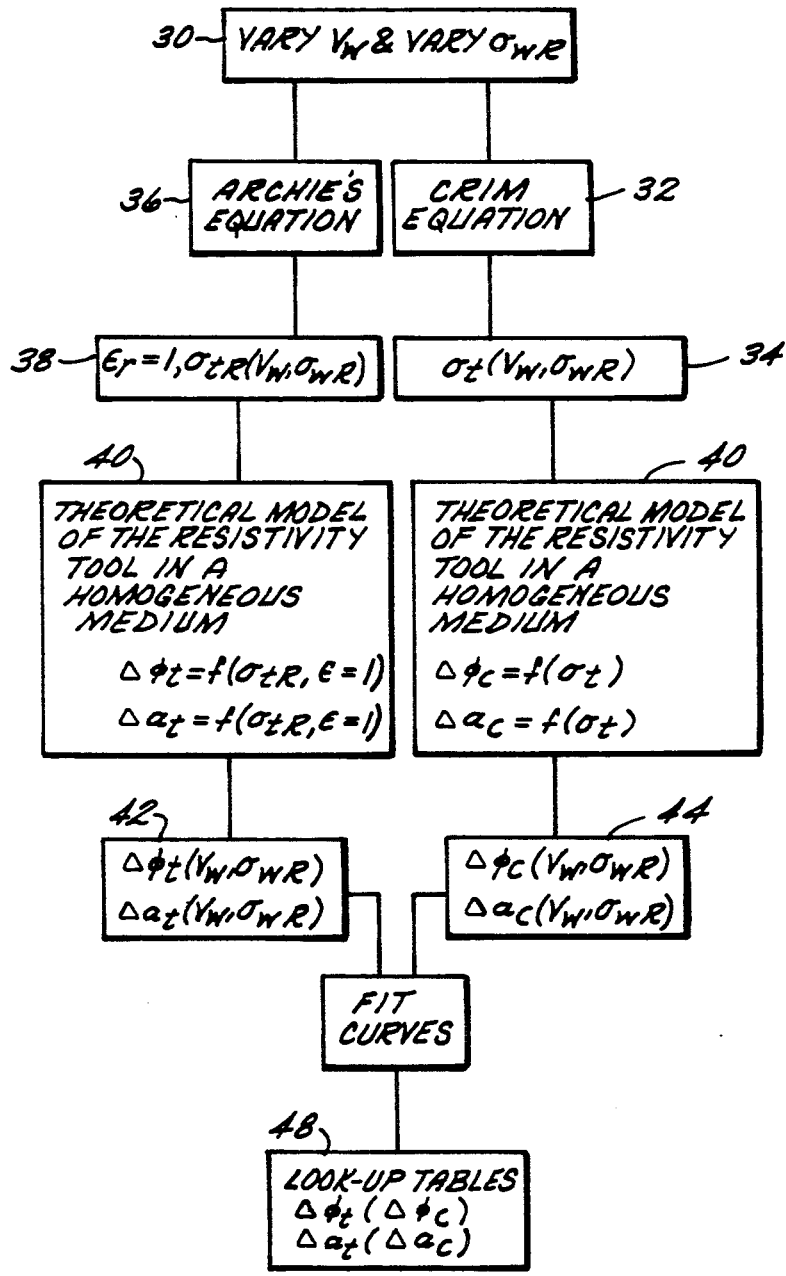
FIG. 6 is a flow diagram depicting a method for determining a look-up table for deriving corrected $R_{pd}$ and corrected $R_{ar}$ in accordance with a second embodiment of the present invention.
Figure 7:
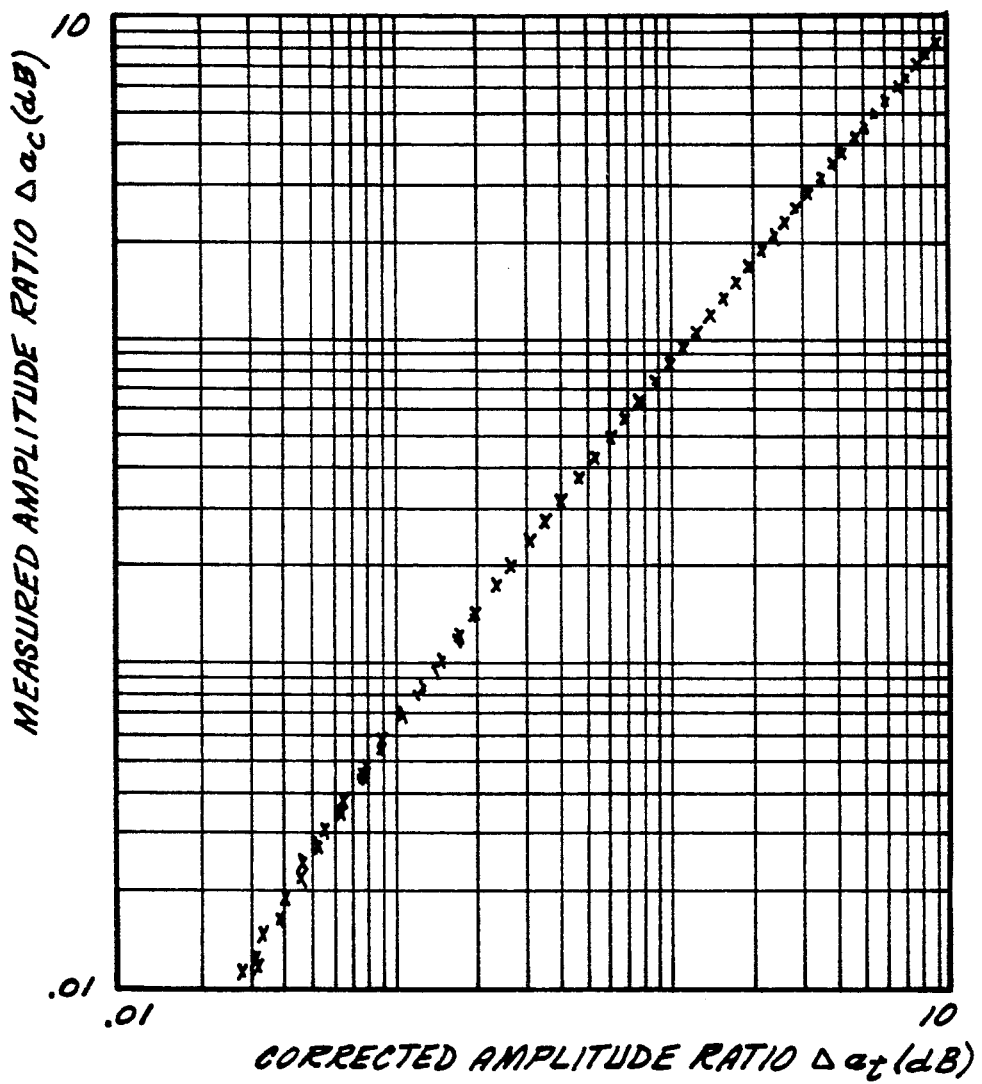
FIG. 7 is a graph of corrected attenuation versus measured attenuation for use in the method of FIG. 6.
Figure 8:
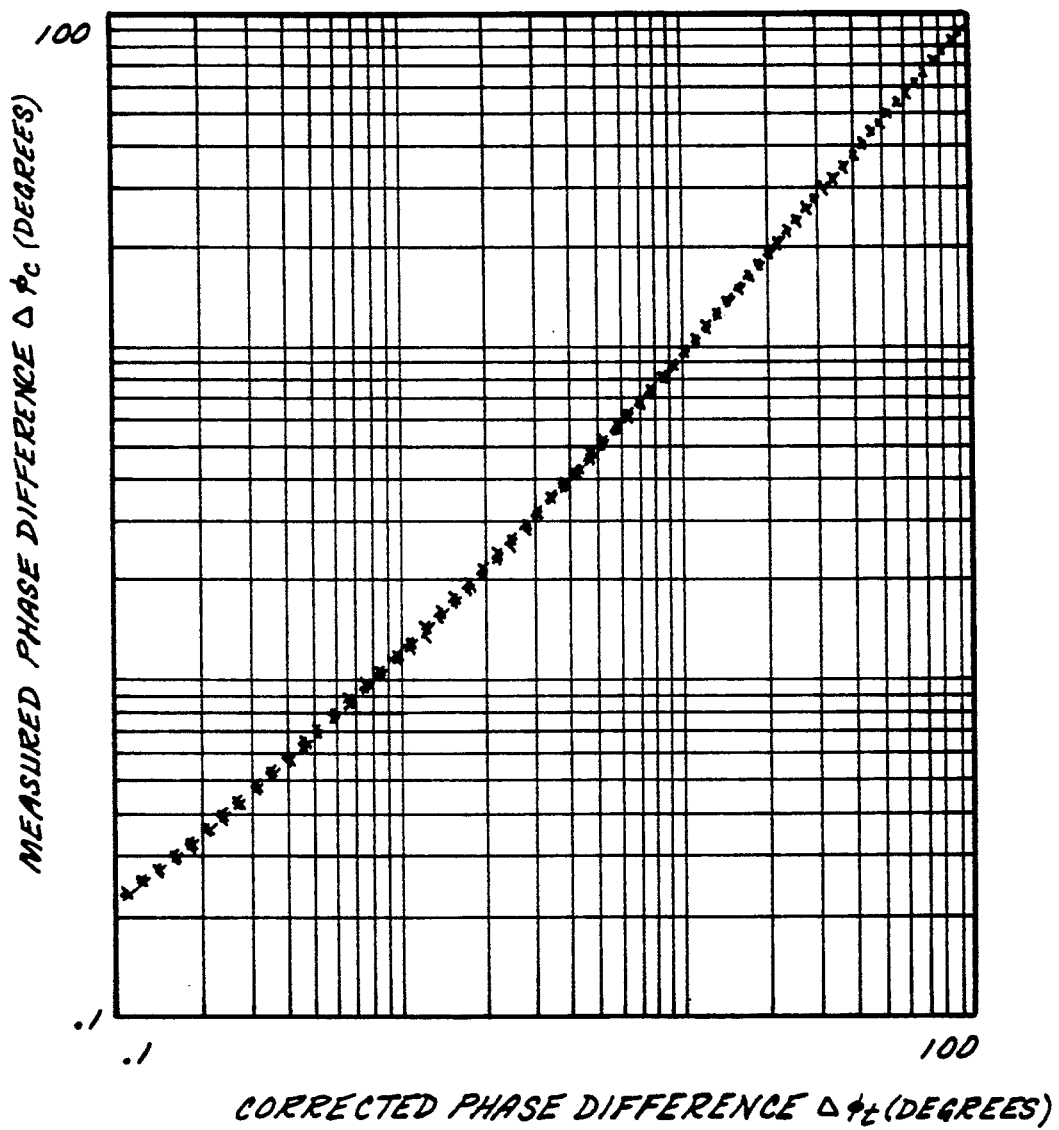
FIG. 8 is a graph of corrected phase difference versus measured phase difference for use in the method of FIG. 6.

Referring now to FIG. 6, a flow chart is shown depicting the method for correcting the resistivity curves $R_{ar}$ and $R_{pd}$ in accordance with a second embodiment of this invention. In 30, $V_w$ and $\sigma_{wR}$ are varied throughout ranges which may be encountered in an earth formation. Values of complex conductivity $\sigma_t$ are calculated from the CRIM equation (5) (see 32 and 34) and values of conductivity $\sigma_{tR}$ are calculated from Archie's equation (6) (see 36 and 38). Using the theoretical model (see 40) of the tool in a homogeneous medium discussed in FIG. 3, a set of values (see 42) for $\Delta\Phi_t$ and $\Delta\alpha_t$ are derived from the set of conductivities derived from Archie's equation with $\epsilon_r=1$; and a set of values for $\Delta\Phi_t$ and $\Delta\alpha_t$ are derived from the CRIM equation (see 44). This data derived from the CRIM equation are plotted against the data derived from Archie's equation in two figures representing the corrected amplitude ratio as a function of the amplitude ratio measured by the tool (FIG. 7); and a corrected phase difference as a function of the phase difference measured by the tool (FIG. 8). Next, a look-up table 48 is made from a curve which is fit (see 46) to each set of curves in FIGS. 7 and 8.

Figure 9:
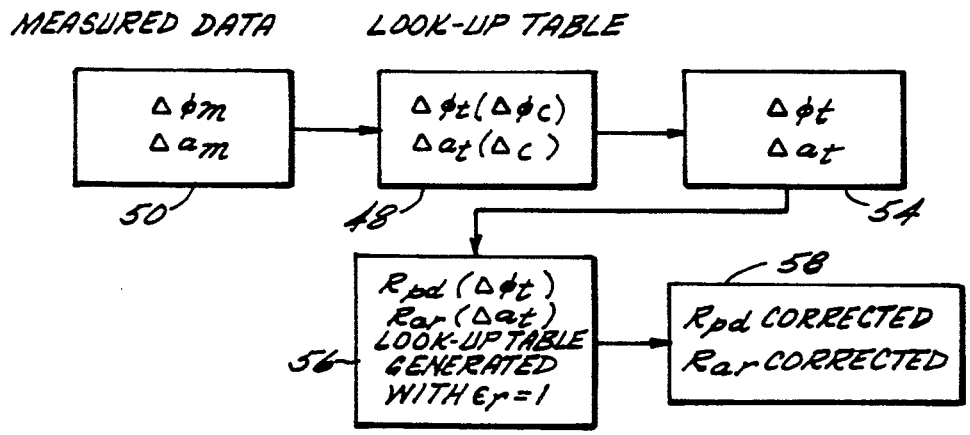
FIG. 9 is a flow diagram showing use of the look-up table derived from the method of FIG. 6 in deriving correct $R_{pd}$ and $R_{ar}$

Referring now to FIG. 9, the phase difference $\Delta\Phi_m$ and amplitude ratio $\Delta\alpha_m$ actually measured by the tool (see 50) are corrected using look-up table 48 to derive corrected $\Delta\Phi_t$ and $\Delta\alpha_t$ (see 54). A second look-up table 56 (for the conditions $\epsilon_r=1$) relates $R_{pd}$ to $\Delta\Phi_t$ and $R_{ar}$ to $\Delta\alpha_t$ to obtain corrected resistivity values $R_{pd}$ and $R_{ar}$ (see 53) to provide the corrected formation resistivity log of FIG. 2. Look-up table 56 is generated by using the theoretical model 40 with inputs of various $R_t$ and $\epsilon_r$ equal to 1.

Neither the FIG. 5 or FIG. 9 embodiments of this invention require the use of a correlation between dielectric and resistivity. This is believed to be an advantageous and important feature of the present invention.

While the present invention has been described using the Archie and CRIM equations, it will be appreciated that other suitable low frequency and high frequency mixing law equations may be employed in the method of this invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for evaluating a subterranean borehole formation using a wave propagation formation evaluation tool wherein the wave propagation formation evaluation tool obtains a measured phase difference $\Delta\Phi_m$ and a measured amplitude ratio $\Delta\alpha_m$, with both $\Delta\Phi_m$ and $\Delta\alpha_m$ having an error component associated therewith, comprising the steps of:

(1) determining a true formation resistivity $R_t$ over a preselected range of values for water volume $V_w$ and water conductivity $\sigma_{wR}$ using a low frequency mixing law;

(2) determining a relative dielectric constant $\epsilon_r$ over said preselected range of values for $V_w$ and $\sigma_{wR}$ using a high frequency mixing law;

(3) determining a theoretical phase difference $\Delta\Phi$ and a theoretical amplitude ratio $\Delta\alpha$ as a function of $R_t$ and $\epsilon_r$;

(4) determining a first set of resistivities, $R_{pd}(\Delta\Phi)$, as a function of $\Delta\Phi$;

(5) determining a second set of resistivities, $R_{ar}(\Delta\alpha)$, as a function of $\Delta\alpha$;

(6) drilling a subterranean borehole through a formation using a wave propagation formation evaluation tool to define a subterranean borehole formation;

(7) measuring $\Delta\Phi_m$ and $\Delta\alpha_m$ with said wave propagation formation evaluation tool;

(8) comparing $R_{pd}(\Delta\Phi)$ to $\Delta\Phi_m$ to determine a corrected $R_{pd}$;

(9) comparing $R_{ar}(\Delta\alpha)$ to $\Delta\alpha_m$ to determine a corrected $R_{ar}$;

(10) generating a formation resistivity log from said corrected $R_{pd}$ and said corrected $R_{ar}$; and

(11) evaluating the subterranean borehole formation based on said generated formation resistivity log.

2. The method of claim 1 wherein:
said low frequency mixing law comprises Archie's Equation.

3. The method of claim 1 wherein:
said high frequency mixing law comprises the CR1M Equation.

4. The method of claim 2 wherein:
said high frequency mixing law comprises the CR1M Equation.

5. The method of claim 1 wherein:
steps (4) and (5) each generate a look-up table.

6. The method of claim 5 wherein:
steps (8) and (9) include the step of using the look-up table to determine corrected $R_{pd}$ and corrected $R_{ar}$, respectively.

7. The method of claim 1 wherein:
the relationship between $R_{pd}$ and $\Delta\Phi$ is a curve fit to the data $R_{pd}$ vs. $\Delta\Phi$ as parameters of preselected values of $V_w$ and $\sigma_{wR}$; and
the relationship between $R_{ar}$ and $\Delta\alpha$ is a curve fit to the data $R_{ar}$ vs. $\Delta\alpha$ as parameters of preselected values of $V_w$ and $\sigma_{wR}$.

8. A method for evaluating a subterranean borehole formation using a wave propagation formation evaluation tool wherein the wave propagation formation evaluation tool obtains a measured phase difference $\Delta\Phi_m$ and a measured amplitude ratio $\Delta\alpha_m$, with both $\Delta\Phi_m$ and $\Delta\alpha_m$ having an error component associated therewith comprising the steps of:

(1) determining a true formation conductivity $\sigma_{tR}$ over a preselected range of values for water volume $V_w$ and water conductivity $\sigma_{wR}$ using a low frequency mixing law;

(2) determining a complex conductivity $\sigma_t$ over said preselected range of values for $V_w$ and $\sigma_{wR}$ using a high frequency mixing law;

(3) determining a theoretical phase difference $\Delta\Phi_t$ and a theoretical amplitude ratio $\Delta\alpha_t$ as a function of the true formation conductivity $\sigma_{tR}$;

(4) determining a theoretical phase difference $\Delta\Phi_c$ and a theoretical amplitude ratio $\Delta\alpha_c$ as a function of the complex conductivity $\sigma_t$;

(5) determining a relationship between $\Delta\Phi_t$ and $\Delta\Phi_c$ for the preselected values of $V_w$ and $\sigma_{wR}$ from step (1) to determine $\Delta\Phi_t(\Delta\Phi_c)$;

(6) determining a relationship between $\Delta\alpha_t$ and $\Delta\alpha_c$ for the preselected values of $V_w$ and $\sigma_{wR}$ from step (1) to determine $\Delta\alpha_t(\Delta\alpha_c)$;

(7) drilling a subterranean borehole through a formation using a wave propagation formation evaluation tool to define a subterranean borehole formation;

(8) measuring $\Delta\Phi_m$ and $\Delta\alpha_m$ with said wave propagation formation evaluation tool;

(9) generating a corrected $\Delta\Phi_t$ from $(\Delta\Phi_m)$ using the relationship $\Delta\Phi_t(\Delta\Phi_c)$;

(10) generating a corrected $\Delta\alpha_t$ from $\Delta\alpha_m$ using the relationship $\Delta\alpha_t(\Delta\alpha_c)$;

(11) generating a corrected $R_{pd}$ from the corrected $\Delta\Phi_t$ using a known relationship between resistivity and phase difference for real conductivities and a dielectric constant of unity $R_{pd}(\Delta\Phi_t)_r$;

(12) generating a corrected $R_{ar}$ from the corrected $\Delta\alpha_t$ using the known relationship between resistivity and amplitude ratio or real conductivities and a dielectric constant of unity $R_{ar}(\Delta\alpha_t)_r$;

(13) generating a formation resistivity log from said corrected $R_{pd}$ and said corrected $R_{ar}$; and

(14) evaluating the subterranean borehole formation based on said generated formation resistivity log.

9. The method of claim 7 wherein:
said low frequency mixing law comprises Archie's Equation.

10. The method of claim 7 wherein:
said high frequency mixing law comprises the CR1M Equation.

11. The method of claim 8 wherein:
said high frequency mixing law comprises the CR1M Equation.

12. The method of claim 1 wherein:
steps (5) and (6) each generate a first look-up table.

13. The method of claim 12 wherein:
steps (9) and (10) include the step of using the look-up table to generate corrected $\Delta\Phi_t$ and $\Delta\alpha_t$, respectively.

14. The method of claim 1 wherein:
steps (11) and (12) each include the step of generating corrected $R_{pd}$ and $R_{ar}$ from a look-up table.

15. The method of claim 12 wherein:
steps (11) and (12) each include the step of generating corrected $R_{pd}$ and $R_{ar}$ from a second look-up table.

16. The method of claim 13 wherein:
steps (11) and (12) each include the step of generating corrected $R_{pd}$ and $R_{ar}$ from a second look-up table.

17. The method of claim 8 wherein the relationship between $\Delta\Phi_t$ and $\Delta\Phi_c$ is a curve fit to the data $\Delta\Phi_t$ vs. $\Delta\Phi_c$ as parameters of preselected values of $V_w$ and $\sigma_{wR}$.

18. The method of claim 8 wherein the relationship between $\Delta\alpha_t$ and $\Delta\alpha_c$ is a curve fit to the data $\Delta\alpha_t$ vs. $\Delta\alpha_c$ as parameters of preselected values of $V_w$ and $\sigma_{wR}$.

* * * * *